US011870161B2

(12) United States Patent
Tang et al.

(10) Patent No.: US 11,870,161 B2
(45) Date of Patent: Jan. 9, 2024

(54) WEARABLE DEVICE

(71) Applicant: Wistron Corporation, New Taipei (TW)

(72) Inventors: Wen-Lang Tang, New Taipei (TW); Chih-Feng Yeh, New Taipei (TW); Jen-Hsiang Chiang, New Taipei (TW)

(73) Assignee: Wistron Corporation, New Taipei (TW)

( * ) Notice: Subject to any disclaimer, the term of this patent is extended or adjusted under 35 U.S.C. 154(b) by 43 days.

(21) Appl. No.: 17/737,945

(22) Filed: May 5, 2022

(65) Prior Publication Data

US 2023/0291105 A1 Sep. 14, 2023

(30) Foreign Application Priority Data

Mar. 8, 2022 (TW) ................................ 111108365

(51) Int. Cl.
*H01Q 7/08* (2006.01)
*H01Q 1/27* (2006.01)

(52) U.S. Cl.
CPC ............... *H01Q 7/08* (2013.01); *H01Q 1/273* (2013.01)

(58) Field of Classification Search
CPC ................................ H01Q 7/08; H01Q 1/273
See application file for complete search history.

(56) References Cited

U.S. PATENT DOCUMENTS

2013/0181876 A1* 7/2013 Miura .................... H01Q 25/00
343/788
2018/0062275 A1 3/2018 Kim

FOREIGN PATENT DOCUMENTS

| | | | | |
|---|---|---|---|---|
| CN | 102544730 | A | | 7/2012 |
| JP | 2003-315476 | A | | 11/2003 |
| JP | 2007-166001 | A | | 6/2007 |
| JP | 2008092131 | A | * | 4/2008 |
| JP | 2010-199952 | A | | 9/2010 |
| JP | 2018-504871 | A | | 2/2018 |

* cited by examiner

*Primary Examiner* — Dieu Hien T Duong
(74) *Attorney, Agent, or Firm* — Winston Hsu

(57) ABSTRACT

A wearable device is provided. The wearable device includes a substrate and a first antenna module. The first antenna module includes a first magnetic core and a first antenna wire coil. The first magnetic core is disposed on the substrate. A first angle is formed between the first magnetic core and the substrate. The first antenna wire coil is wound disposed on the first magnetic core.

10 Claims, 9 Drawing Sheets

WEARABLE DEVICE

BACKGROUND OF THE INVENTION

1. Field of the Invention

The present invention relates to a wearable device, and more particularly, to a wearable device with angular antenna.

2. Description of the Prior Art

With the advanced development of mobile payment, an electronic device with near field communication (NFC) function is widely used for payment instrument. NFC technology allows two electronic devices equipped with antennas to communicate wirelessly within a proximity distance. A user can take an electronic tag with NFC function near a reader for data exchange. Most of the electronic devices having the NFC function typically adopt planar antennas for communication. However, since the planar antenna is usually disposed under a screen or on the circuit board, the induced range of the magnetic field produced by the planar antenna may be limited to the screen surface or back of the electronic device. Further, each reader may have different reading angles based on the position and angle of the reader. As shown in FIG. 1, a user wears a watch, and an NFC planar antenna is disposed on the watch surface. The magnetic field M produced by the planar antenna is a single direction magnetic field perpendicular to the watch surface. In order to allow the card reader to access the information in the watch worn on the user's wrist, the user has to turn his or her wrist through a large rotation angle to make the direction of the magnetic field M inducted by the planar antenna of the watch align with the reader to be successfully sensed. As such, the operation posture requiring twisting and rotating his or her wrist at a large rotation angle is an unnatural and uncomfortable posture, and also not ergonomic for the user. Thus, there is a need for improvement.

SUMMARY OF THE INVENTION

It is therefore an objective of the present invention to provide a wearable device with angular antenna, to solve the problems in the prior art.

The present invention discloses a wearable device, comprising: a substrate; and a first antenna module, comprising: a first magnetic core, disposed on the substrate, wherein a first angle is formed between the first magnetic core and the substrate; and a first antenna wire coil, wound disposed on the first magnetic core.

The present invention further discloses a wearable device, comprising: a first substrate; a second substrate; a first antenna module, comprising: a first magnetic core, disposed on the first substrate, wherein a first angle is formed between the first magnetic core and the first substrate; and a first antenna wire coil, wound disposed on the first magnetic core; a second antenna module, comprising a second antenna wire coil disposed on the second substrate; a chip; and at least one switch, disposed on the second substrate, each switch coupled to the chip and the second antenna wire coil, and each switch corresponding to an application function; wherein a first current flows through the first antenna wire coil and a magnetic field is produced accordingly, and the magnetic field passes through the second antenna wire coil.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
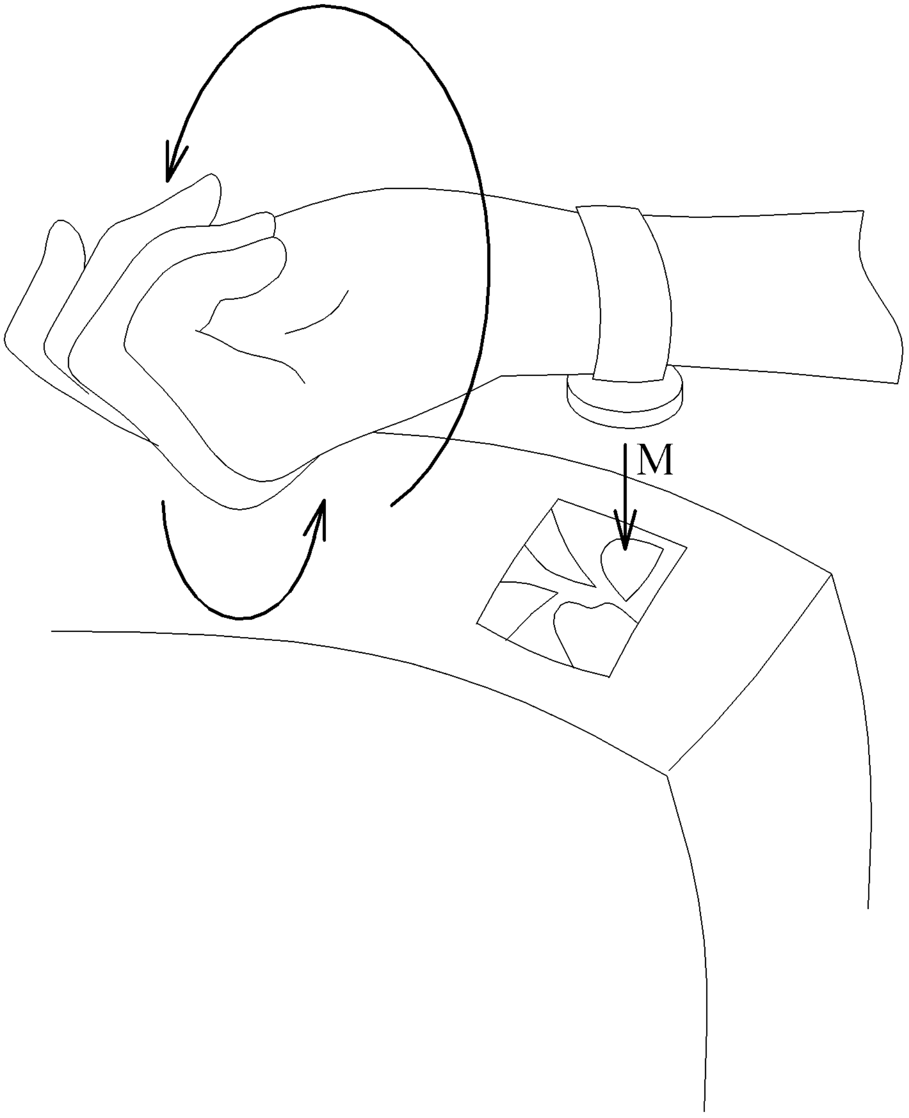
FIG. 1 PRIOR ART
FIG. 1 is a schematic diagram illustrating a contactless payment operation by tapping or waving a conventional wearable over a card reader when the user intends to pay.
Figure 2:
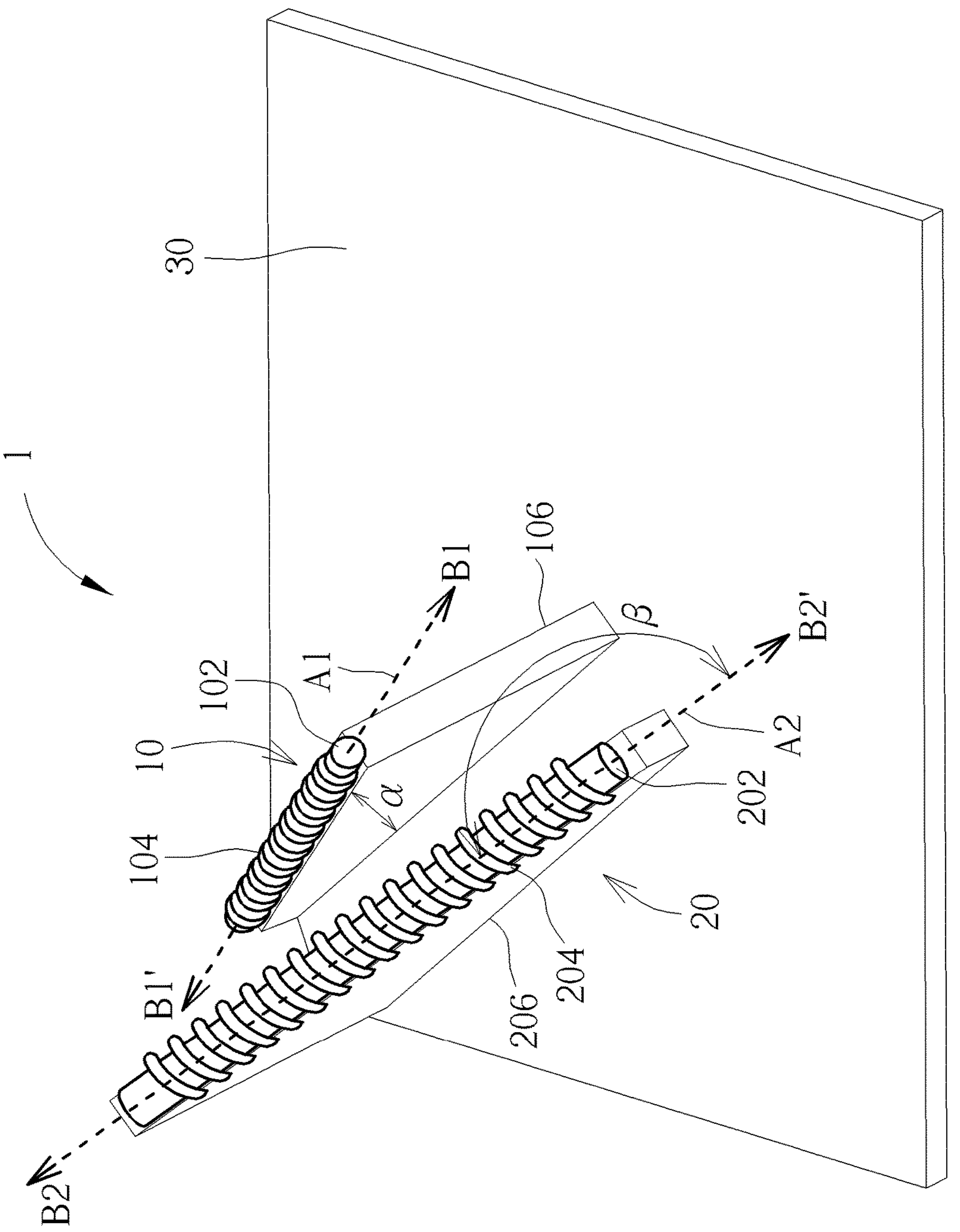
FIG. 2 is a schematic diagram of a wearable device according to an embodiment of the present invention.
Figure 3:
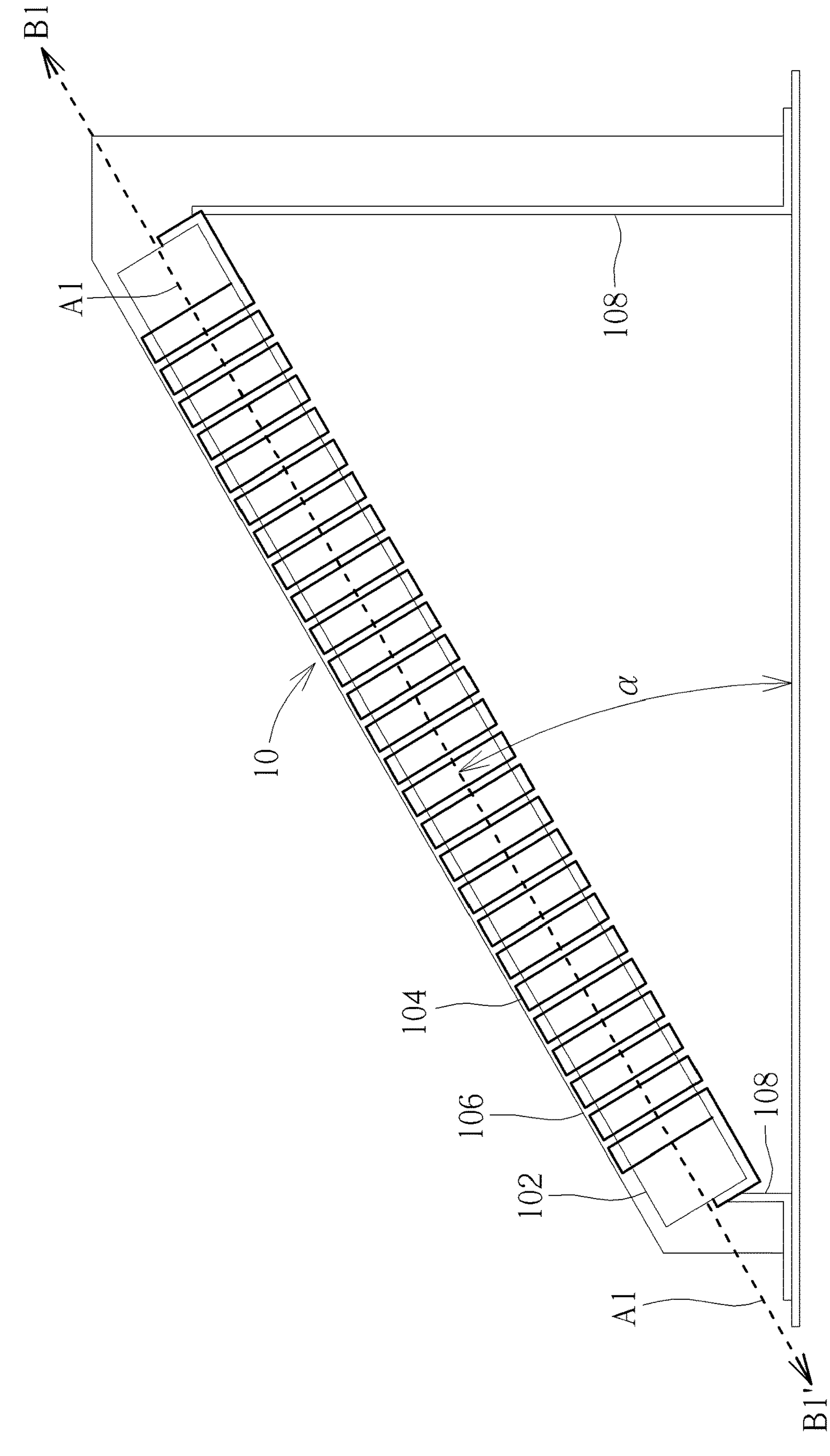
FIG. 3 is a schematic diagram illustrating a side view of a first antenna module of the wearable device according to an embodiment of the present invention.
Figure 4:
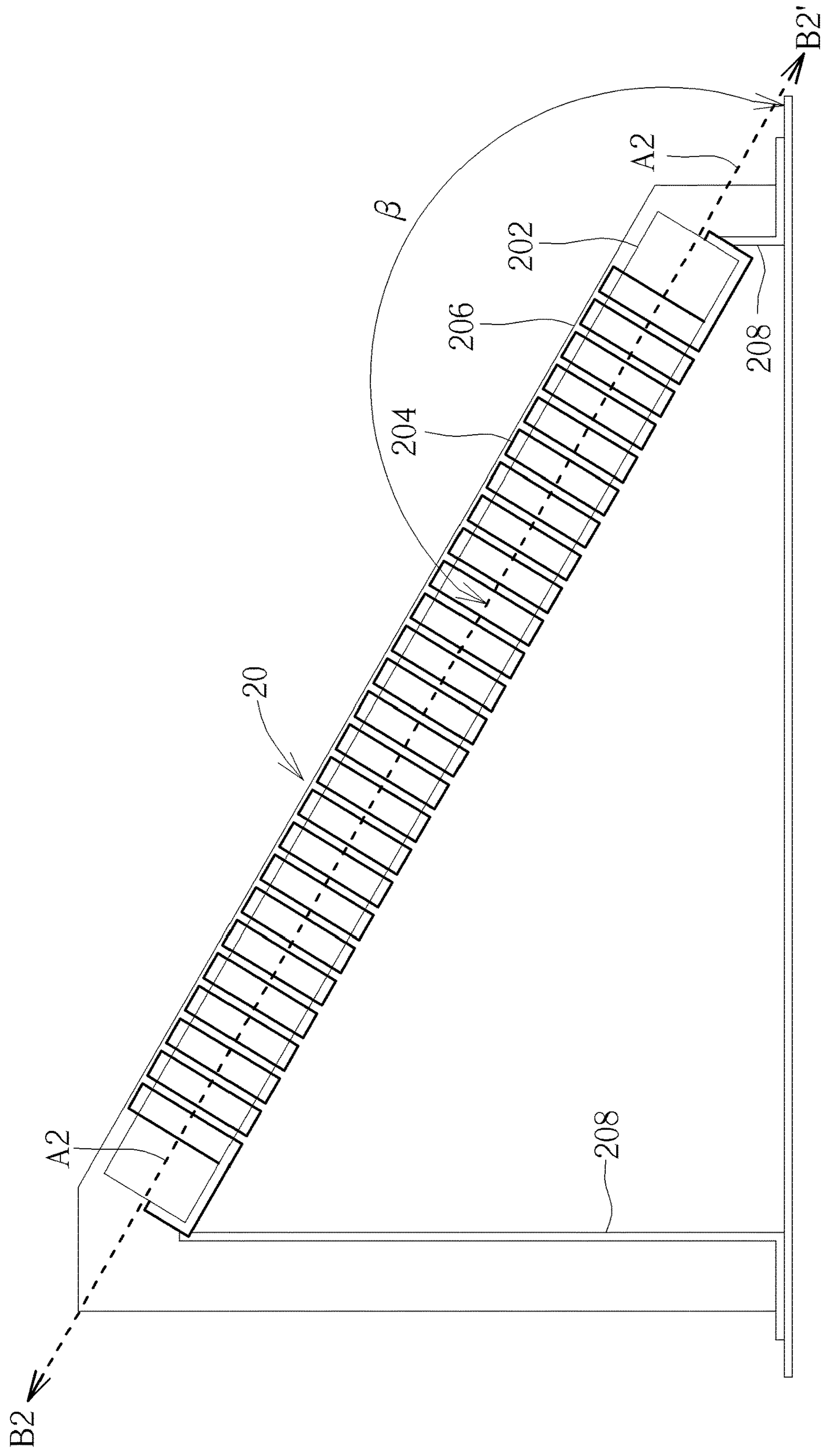
FIG. 4 is a schematic diagram illustrating a side view of a second antenna module of the wearable device according to an embodiment of the present invention.

Please refer to FIG. 2 to FIG. 4. FIG. 2 is a schematic diagram of a wearable device 1 according to an embodiment of the present invention. FIG. 3 is a schematic diagram illustrating a side view of an antenna module 10 of the wearable device 1 according to an embodiment of the present invention. FIG. 4 is a schematic diagram illustrating a side view of an antenna module 20 of the wearable device 1 according to an embodiment of the present invention. The wearable device 1 may be a smart watch, a smart wrist band, a smart bracelet, a smart glove, a smart glasses, a smart phone or any other device that can be worn on the human body or clothing. The wearable device 1 includes the antenna modules 10 and 20, and a substrate 30. The antenna module 10 includes a magnetic core 102, an antenna wire coil 104, a supporting component 106 and a lead frame 108. The substrate 30 is fixed and disposed on a case, a bracket, a supporting component or other fixing component of the wearable device 1. The magnetic core 102 is disposed on the substrate 30. The magnetic core 102 has an axis A1. The antenna wire coil 104 is wound disposed on the magnetic core 102. The antenna wire coil 104 is wound around the axis A1 and wrapped around an outer surface of the magnetic core 102 in a spirally wound shape, such that a direction of an induced magnetic field B1 (B1') of the antenna module 10 is parallel to the axis A1. An angle α is formed between the magnetic core 102 and the substrate 30. As shown in FIG. 2 and FIG. 3, there is an angle α between the magnetic core 102 and the substrate 30. The supporting component 106 is utilized for supporting and fixing the magnetic core 102 and the antenna wire coil 104 on the substrate 30. The lead frame 108 is coupled to the antenna wire coil 104 for signal transmission. The antenna wire coil 104 is coupled to a chip (not shown in figures) through the lead frame 108 for transmitting related signals. The lead frame 108 is also utilized for supporting and fixing the magnetic core 102 and the antenna wire coil 104.

The antenna module 20 includes a magnetic core 102, an antenna wire coil 204, a supporting component 206 and a lead frame 208. The magnetic core 202 is disposed on the substrate 30. The magnetic core 202 has an axis A2. The antenna wire coil 204 is wound disposed on the magnetic core 202. The antenna wire coil 204 is wound around the axis A2 and wrapped around an outer surface of the magnetic core 202 in a spirally wound shape, such that a direction of an induced magnetic field B2 (B2') of the antenna module 20 is parallel to the axis A2. An angle β is formed between the magnetic core 202 and the substrate 30. As shown in FIG. 2 and FIG. 4, there is an angle β between the magnetic core 202 and the substrate 30. The supporting component 206 is utilized for supporting and fixing the magnetic core 202 and the antenna wire coil 204 on the substrate 30. The lead frame 208 is coupled to the antenna wire coil 204 for signal transmission. The antenna wire coil 204 is coupled to a chip (not shown in figures) through the lead frame 208 for transmitting related signals. The lead frame 208 is also utilized for supporting and fixing the magnetic core 202 and the antenna wire coil 204. Therefore, the embodiments of the present invention provide the antenna module with angular wire coil capable of covering a wider range of magnetic field induction and providing a faster and more convenient user experience during payment operation.

Please further refer to FIG. 2 to FIG. 4. Through the arrangement of the angle α between the magnetic core 102 and the substrate 30 and the angle β between the magnetic core 202 and the substrate 30, the position of magnetic field sensing may be designed more flexibly. For example, the angle α between the magnetic core 102 and the substrate 30 may be 25 degrees, 30 degrees, 45 degrees, 50 degrees, 60 degrees, 70 degrees or 80 degrees, but not limited thereto. The angle β between the magnetic core 202 and the substrate 30 may be 100 degrees, 110 degrees, 120 degrees, 130 degrees, 135 degrees, 150 degrees or 155 degrees, but not limited thereto. In an embodiment, the angle α between the magnetic core 102 and the substrate 30 may be different from the angle β between the magnetic core 202 and the substrate 30 so as to cover a wider range of magnetic field induction. In an embodiment, a sum of the angle α between the magnetic core 102 and the substrate 30 and the angle β between the magnetic core 202 and the substrate 30 may be 180 degrees. For example, as shown in FIG. 2, the angle α is 30 degrees, and the angle β is 150 degrees. In an embodiment, the angle α between the magnetic core 102 and the substrate 30 may be in a range of 20 degrees to 80 degrees. The angle β between the magnetic core 20 and the substrate 30 may be in a range of 100 degrees to 160 degrees. In an embodiment, the angle α between the magnetic core 102 and the substrate 30 may be smaller than or equal to 90 degrees. The angle β may be greater than 90 degrees. Moreover, the antenna modules 10 and 20 may conform to NFC or radio frequency identification (RFID) communication standard specification, but not limited thereto. The magnetic cores 102 and 202 may include magnetic materials, such as ferrite magnetic material, but not limited thereto. The antenna wire coils 104 and 204 may include conductive materials, such as Cu, Ag, but not limited thereto.

Figure 5:
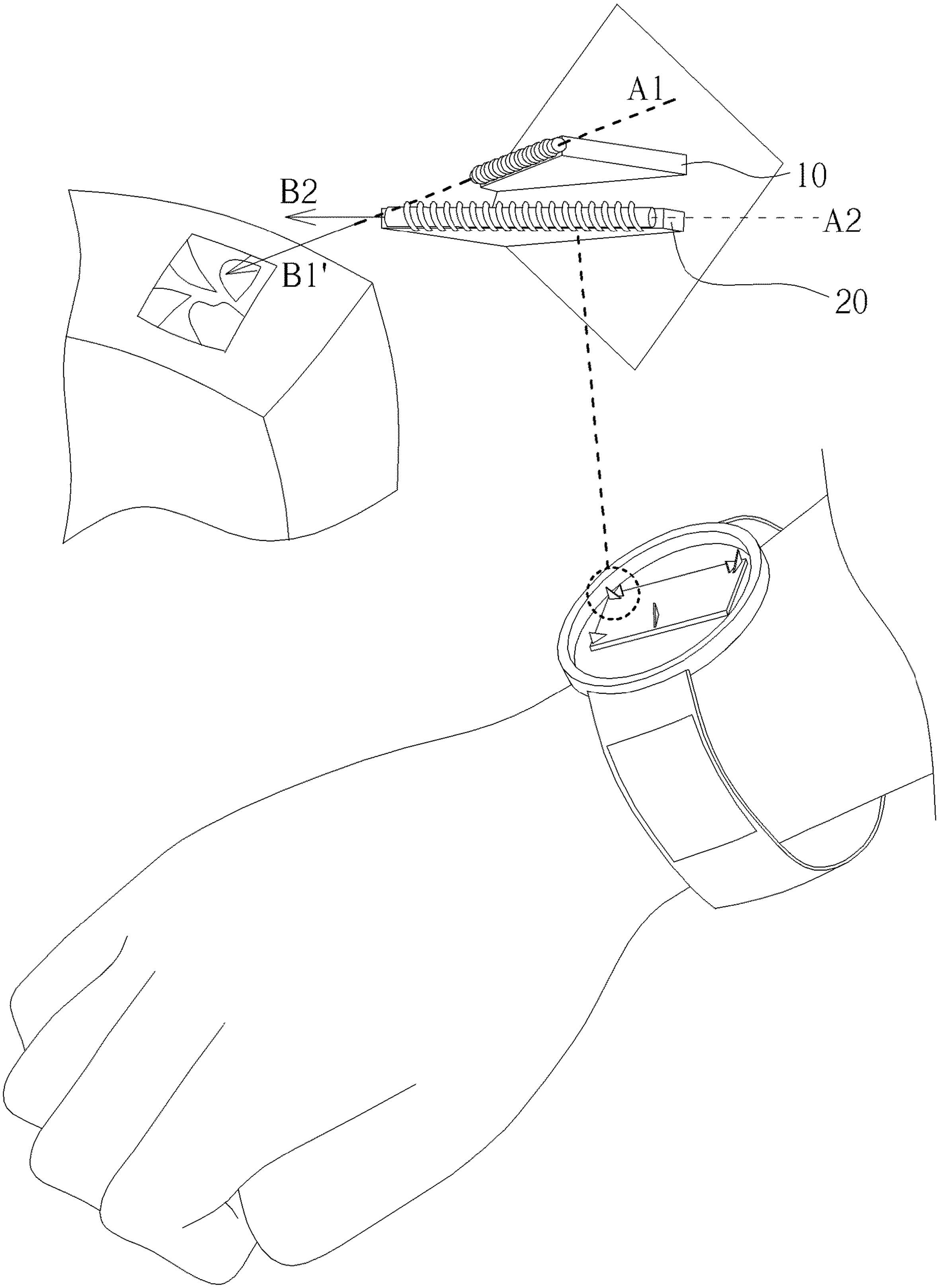
FIG. 5 is a schematic diagram illustrating an application situation of the wearable device according to an embodiment of the present invention.

Please refer to FIG. 5, which is a schematic diagram illustrating an application situation of the wearable device 1 according to an embodiment of the present invention. For example, the wearable device 1 may be a watch, and the substrate 30 is disposed in the watch. The antenna modules 10 and 20 are disposed at the edge of the substrate 30, respectively. As shown in FIG. 5, the induced magnetic field B1' of the antenna module 10 is very close to a card reader. The user wearing the wearable device 1 only needs to slightly move his or her wrist to sense the magnetic field of the card reader for data exchange without turning his or her wrist at a large angle. Therefore, the embodiments of the present invention not only provide the user an ergonomic, friendly and intuitive user experience during payment operation, but also significant facilitate the speed of the mobile payment or card tapping payment. Moreover, through the arrangement of the antenna module 10 and the antenna module 20 in pairs, two different induced magnetic field directions may be provided. As shown in FIG. 5, the direction of the induced magnetic field B1' is inclined downward. The direction of the induced magnetic field B2 is inclined upward. The directions of the induced magnetic fields B1' and B2 may extend to the side or edge of the case of the watch case so as to enhance the magnetic field induction of the side or edge of the case of the wearable device 1, thereby providing a wider magnetic field induction range and effectively solving the problem of the limited sensing direction on the surface or the back of the conventional planar antenna. In brief, the embodiments of the present invention employ the antenna modules with angular coils capable of covering a wider range of magnetic field induction and providing the user a fast and more convenient user experience during payment operation. Since the conventional wearable device typically use the planar antenna, only the magnetic field with a single specific induced magnetic field direction is produced, which leads to inconvenience in practical use. Compared with the conventional wearable device, the embodiments of the present invention may improve the flexibility of use and provide the user with a more convenient and friendly user interface without being limited to a single specific induced magnetic field direction.

Figure 6:
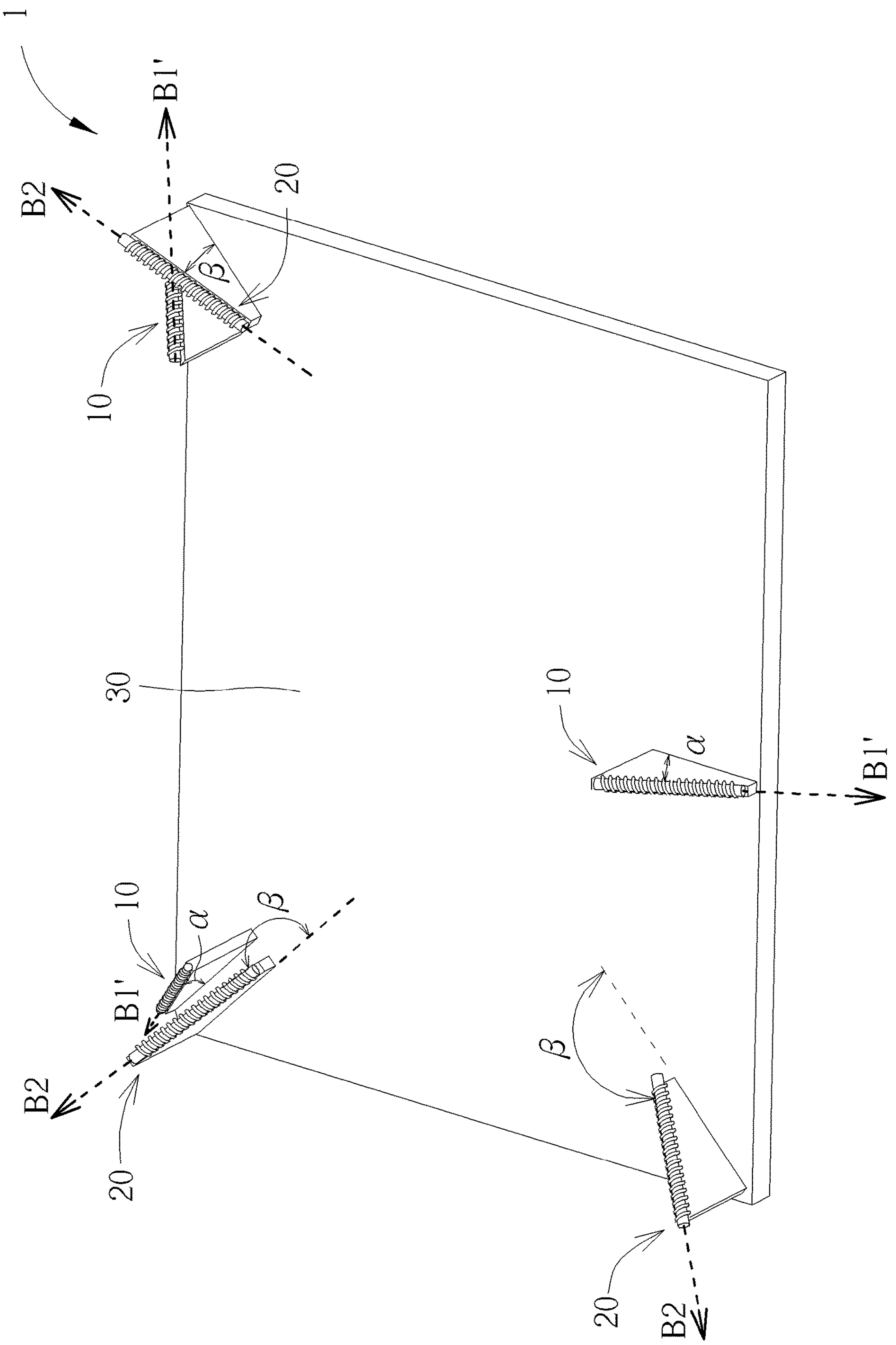
FIG. 6 is a schematic diagram of the wearable device according to an alternative embodiment of the present invention.
Figure 7:
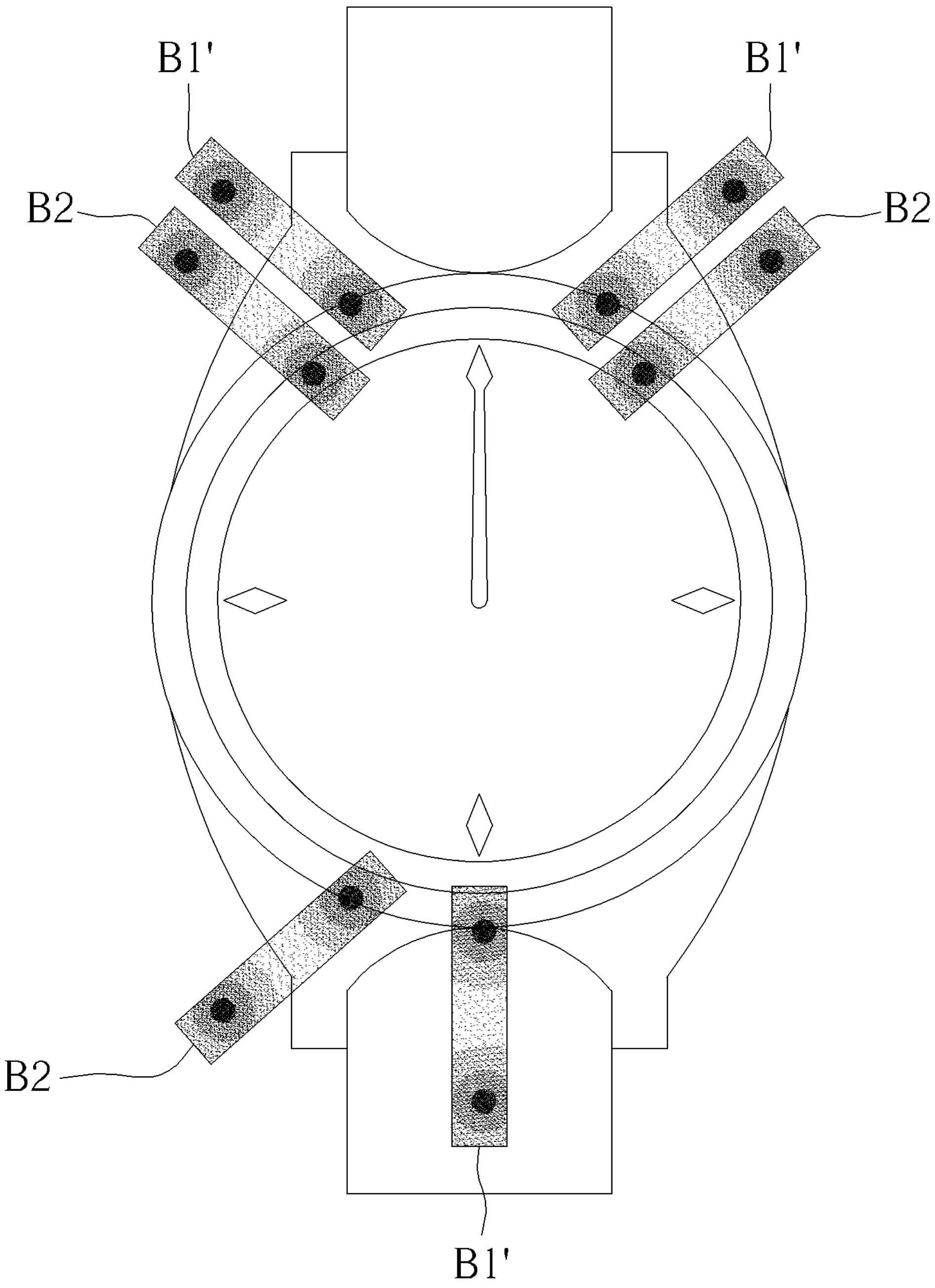
FIG. 7 is a schematic diagram illustrating the magnetic field distribution of the antenna modules shown in FIG. 6 according to an embody

The number, included angle and position of the antenna modules of the embodiments may be varied and designed according to system requirements. Please refer to FIGS. 6 and 7. FIG. 6 is a schematic diagram of the wearable device 1 according to an alternative embodiment of the present invention. FIG. 7 is a schematic diagram illustrating the magnetic field distribution of the antenna modules shown in FIG. 6. For example, as shown in FIG. 6, the wearable device 1 may include a plurality of antenna modules 10 and a plurality of antenna modules 20. The antenna module 10 and the antenna module 20 may be arranged in pairs and adjacent to each other. For example, the antenna module 10 and the antenna module 20 are arranged in pairs on the upper left corner and the upper left corner of the substrate 30. In addition, the antenna module 10 and the antenna module 20 may be monolithically formed together, so as to reduce the manufacturing time during a pick and place process of product manufacturing. On the other hand, the antenna module 10 and the antenna module 20 may be arranged separately and independently according to design demands. For example, the antenna module 10 may be separately disposed on bottom side of substrate 30. The antenna module 20 may be separately disposed on bottom left corner of substrate 30. As shown in FIG. 7, the wearable device 1 may be a watch, and wide range of induced magnetic fields may be formed on the lateral sides and side edges of the watch case. Through the arrangement of multiple sets of the antenna module 10 and the antenna module 20. The upper side and lower side of the front left of the watch, the upper side and lower side of the back Left of the watch, the upper side and lower side of the front right of the watch may be covered within the magnetic field induction range. Under such a situation, no matter whether the card reader is located on the left or right side of the user, the user wearing the wearable device 1 only needs to simply move the lateral side or edge of the case of the wearable device 1 (e.g., watch) close to the sensing area for performing successful magnetic field induction, without turning his or her wrist at a large angle. Moreover, the user wearing the wearable device 1 may tap the wearable device 1 over the card reader and pass the station on the go. Therefore, for various position and orientation arrangements of readers, the wearable device 1 of the embodiment may be capable of moving to approach the reader at any angle to sense and access data for performing data exchange.

Figure 8:
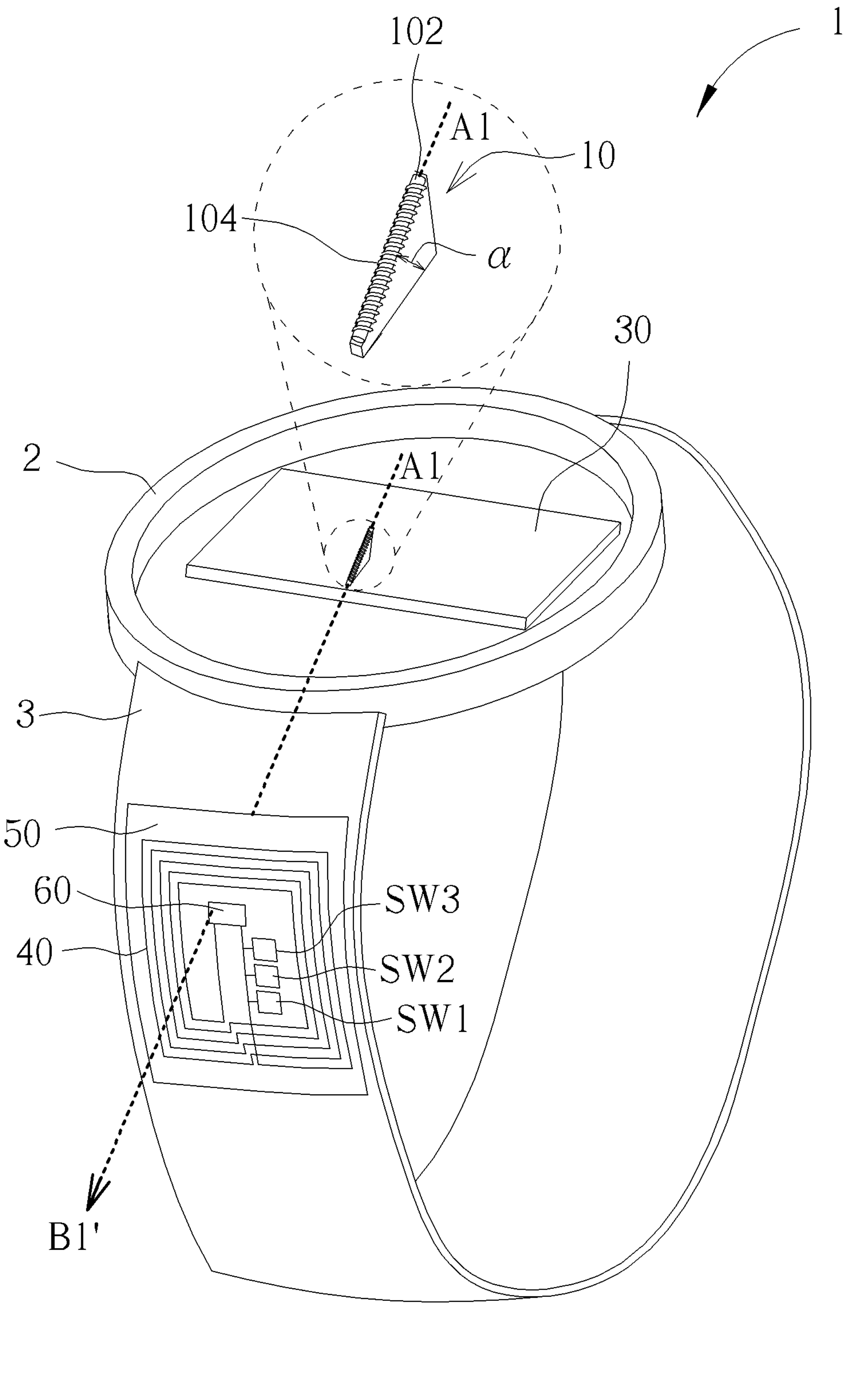
FIG. 8 is a schematic diagram of the wearable device with a hot-key function according to an embodiment of the present invention.

Please refer to FIG. 8, which is a schematic diagram of the wearable device 1 with a hot-key function according to an embodiment of the present invention. As shown in FIG. 8, the wearable device 1 includes a smart watch 2 and a smart wrist band 3. Moreover, the wearable device 1 further includes an antenna module 10 and a substrate 30. The substrate 30 is disposed on the smart watch 2, and the antenna module 10 is disposed on the substrate 30. The magnetic core 102 of the antenna module 10 has an axis A1. The antenna wire coil 104 is wound disposed on the magnetic core 102, and an angle α is formed between the magnetic core 102 and the substrate 30. For example, the angle α may be between 20 and 30 degrees, but not limited thereto. For example, the angle α may be 20 degrees, 25 degrees or 30 degrees, but not limited thereto. As shown in FIG. 8, the wearable device 1 further includes switches SW1 to SW3, an antenna module 40, a substrate 50 and a chip 60. The substrate 50 is disposed on the smart wrist band 3. The antenna module 40 is disposed on the substrate 50. The antenna module 40 includes an antenna wire coil. The antenna wire coil of the antenna module 40 may be a planar antenna wire coil. The switches SW1 to SW3 are disposed on the substrate 50. Each of the switches SW1 to SW3 is coupled to antenna module 40 and the chip 60. Each of the switches SW1 to SW3 corresponds to an application function. The said application function may be any application function that can be performed by the wearable device 1. The application function may be an application function which is performed by executing a specific application program to be controlled or activated by the wearable device 1. For example, the application function may be, but not limited to, recording, taking a picture, dialing to a favorite contact, going to a website or playing music. For example, the application function corresponds to switch SW1 may be the function of taking a picture. The application function corresponds to switch SW2 may be the function of recording. The application function corresponds to switch SW3 may be the function of playing music, and so on. Moreover, the number and type of switches and the application functions triggered by the switches may be arranged and designed according to practical demands. The user may also predetermine the types of application functions in advance and configure the application functions corresponding to each switch.

When a power supply device provides power to the antenna wire coil 104 of the antenna module 10, the current flows through the antenna wire coil 104 and accordingly a magnetic field B1' is produced. As shown in FIG. 8, the magnetic field B1' produced by the antenna module 10 passes through the antenna wire coil of the antenna module 40. That is, the magnetic flux lines of the magnetic field B1' passes through the antenna wire coil of the antenna module 40. Under such a situation, when the user operates one of the switches SW1 to SW3 and the switch is turned on accordingly, a conducting path among the switch to be turned on, the antenna wire coil of the antenna module 40 and the chip 60 is formed. Under the action of the magnetic field B1', a current is induced in the antenna wire coil of the antenna module 40 and the current is provided to the chip 60, such the chip 60 is activated. As such, the chip 60 may detect and determine that the switch is turned on and accordingly generate a corresponding control command signal to control the wearable device 1 for performing an application function corresponding to the switch to be turned on. For example, the switch SW1 corresponds to the application function of taking a picture. When the switch SW1 is pressed and the switch SW1 is turned on, and the chip 60 detects and determines that the switch SW1 is turned on, the chip 60 generates a corresponding control command signal accordingly to control the wearable device 1 for performing an application function of taking pictures corresponding to the switch SW1. Therefore, when the user presses the switch disposed on the smart wristband 3, the wearable device 1 may be controlled to perform the corresponding application function corresponding to the switch for achieving the shortcut key function, thus allowing the user to easily and conveniently activate and use the related functions and improving the efficiency of work and life.

Figure 9:
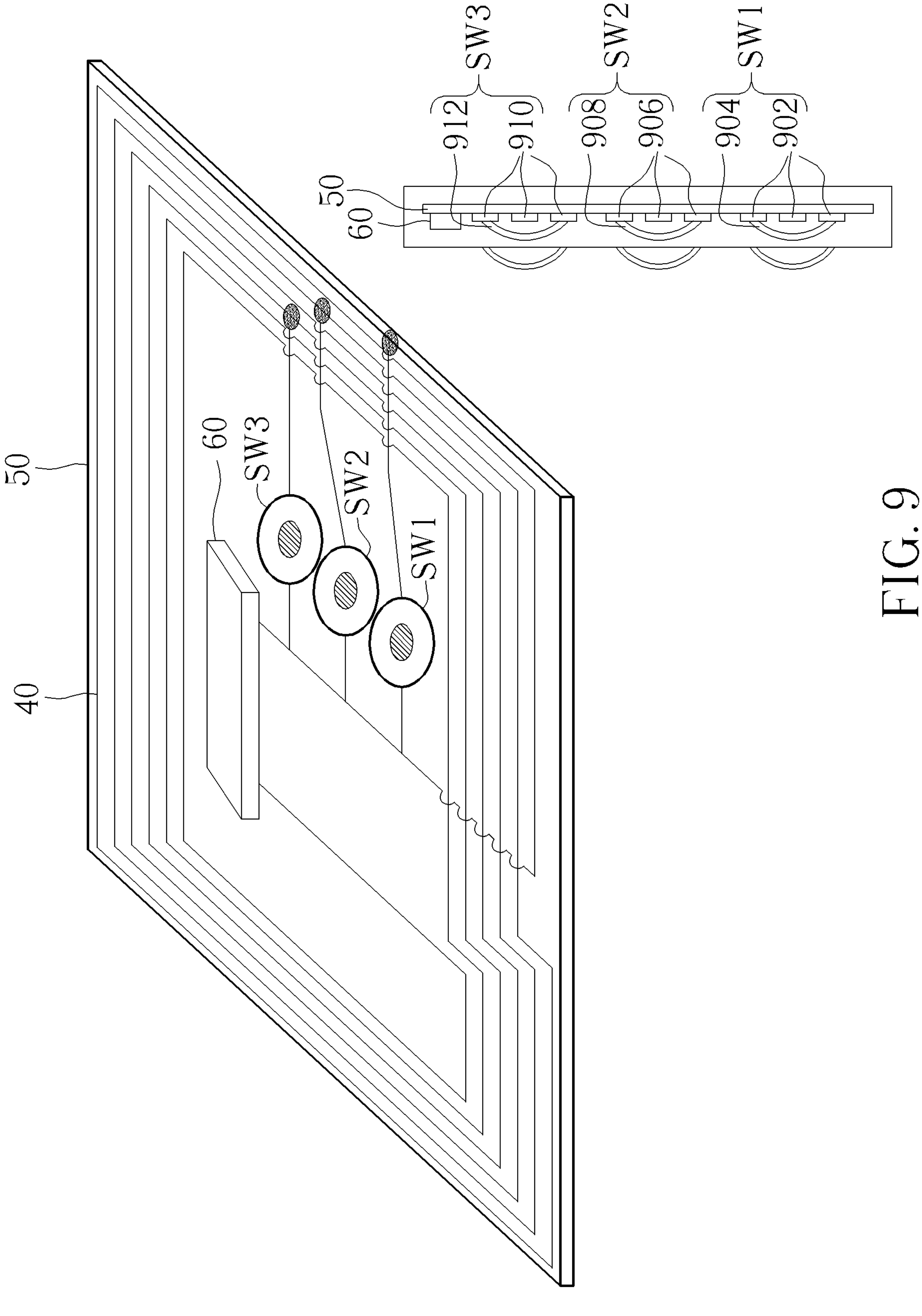
FIG. 9 is a schematic diagram of the switches shown in FIG. 8 according to an embodiment of the present invention.

For example, the switches SW1 to SW3 may be dome switches. Please refer to FIG. 9, which is a schematic diagram of the switches SW1 to SW3 shown in FIG. 8 according to an embodiment of the present invention. The switch SW1 corresponds to a function of taking picture. The switch SW2 corresponds to a function of recording. The switch SW3 corresponds to a function of playing music. The switch SW1 includes an inner and outer ring 902 of a metal ring and a metal dome 904. The inner and outer ring 902 of the metal ring and the metal dome 904 are coupled to the antenna wire coil of the antenna module 40 and the chip 60 respectively. The switch SW2 includes an inner and outer ring 906 of a metal ring and a metal dome 908. The inner and outer ring 906 of the metal ring and the metal dome 908 are coupled to the antenna wire coil of the antenna module 40 and the chip 60 respectively. The switch SW3 includes an inner and outer ring 910 of a metal ring and a metal dome 912. The inner and outer ring 910 of the metal ring and the metal dome 912 are coupled to the antenna wire coil of the antenna module 40 and the chip 60 respectively. When a user presses down the metal dome of the switch, the metal dome is elastically deformed toward the inner and outer ring of the corresponding metal ring and contact the inner and outer ring of the corresponding metal ring. As a result, the switch is changed to a conducting state and a conducting path between the corresponding switch, the antenna wire coil of antenna module 40 and the chip 60 is formed. For example, when the user presses down the metal dome 904 of the switch SW1, the metal dome 904 may be elastically deformed to contact the inner and outer ring 902 of the corresponding metal ring, such that the switch SW1 is changed to a conducting state and a conducting path between the switch SW1, the antenna wire coil of antenna module 40 and the chip 60 is formed. Under such a situation, the chip 60 may detect and determine that the switch SW1 is in the conducting state and accordingly generate a corresponding control command signal for controlling the wearable device 1 for performing the application function corresponding to the switch SW1 (e.g., the function of taking picture). In brief, the user may activate the corresponding hot-key application function through operating the switches SW1 to SW3. Therefore, the embodiments of the invention may provide the hot-key function, and the user needs only to press the switch with the hot-key function of the wearable device 1 to activate and the corresponding application function, thus allowing the user to easily and conveniently activate to use the related application functions and improving the efficiency of work and life.

In summary, the embodiments of the present invention provide the antenna module with angular wire coil capable of covering a wider range of magnetic field induction and providing a faster, more convenient and friendly user experience during payment operation. Moreover, the embodiments of the present invention provides the design of hot-key function that allows the user to quickly and conveniently activate and use the related application functions, thus improving the efficiency and quality of work and life.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wearable device, comprising:
a substrate; and
a first antenna module, comprising:
a first magnetic core, disposed on the substrate, wherein a first angle is formed between the first magnetic core and the substrate; and
a first antenna wire coil, wound disposed on the first magnetic core; and
a second antenna module, comprising:
a second magnetic core, disposed on the substrate, wherein a second angle is formed between the second magnetic core and the substrate, and the second angle is different from the first angle; and
a second antenna wire coil, wound disposed on the second magnetic core;
wherein a sum of the first angle and the second angle is 180 degrees.

2. The wearable device of claim 1, wherein the first angle is between 20 degrees and 80 degrees, and the second angle is between 100 degrees and 160 degrees.

3. The wearable device of claim 1, wherein the first magnetic core has a first axis, the second magnetic core has a second axis, the first antenna wire coil is wound about the first axis and wrapped around an outer surface of the first magnetic core in a spirally wound shape, the second antenna wire coil is wound about the second axis and wrapped around an outer surface of the second magnetic core in the spirally wound shape.

4. The wearable device of claim 3, wherein the first axis is different from the second axis.

5. The wearable device of claim 1, wherein the first angle is between 20 degrees and 80 degrees.

6. The wearable device of claim 1, wherein the first magnetic core has a first axis, the first antenna wire coil is wound about the first axis and wrapped around an outer surface of the first magnetic core in a spirally wound shape.

7. A wearable device, comprising:
a first substrate;
a second substrate;
a first antenna module, comprising:
a first magnetic core, disposed on the first substrate, wherein a first angle is formed between the first magnetic core and the first substrate; and
a first antenna wire coil, wound disposed on the first magnetic core;
a second antenna module, comprising a second antenna wire coil disposed on the second substrate;
a chip; and
at least one switch, disposed on the second substrate, each switch coupled to the chip and the second antenna wire coil, and each switch corresponding to an application function;
wherein a first current flows through the first antenna wire coil and a magnetic field is produced accordingly, and the magnetic field passes through the second antenna wire coil.

8. The wearable device of claim 7, wherein when one of the at least one switch is turned on, the magnetic field generated by the first antenna wire coil passes through the second antenna wire coil and a second current is induced and provided to the chip, and accordingly the chip generates a control command signal to control the wearable device to perform the corresponding application function.

9. The wearable device of claim 7, wherein the first angle is between 20 degrees and 30 degrees.

10. The wearable device of claim 7, wherein the at least one switch comprises a dome switch.

* * * * *